United States Patent
Long et al.

(10) Patent No.: US 6,247,702 B1
(45) Date of Patent: Jun. 19, 2001

(54) BEARING SHAFT SEAL

(75) Inventors: Norman R. Long, Tipp City; Dennis L. Bush, Troy, both of OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/314,801

(22) Filed: May 19, 1999

(51) Int. Cl.$^7$ .................................................. F16J 15/447
(52) U.S. Cl. ........................................... 277/417; 277/421
(58) Field of Search ................................... 277/305, 303, 277/411, 412, 417, 419, 420, 423, 428, 361, 370, 376; 310/88, 89

(56) References Cited

U.S. PATENT DOCUMENTS

| | | | |
|---|---|---|---|
| 1,919,248 | * | 7/1933 | Murphy . |
| 3,880,434 | * | 4/1975 | Echard et al. . |
| 4,079,947 | | 3/1978 | Morris ..................................... 277/13 |
| 4,114,900 | * | 9/1978 | Wiese . |
| 4,153,258 | * | 5/1979 | Huber et al. . |
| 4,290,610 | * | 9/1981 | Lizogub et al. . |
| 4,706,968 | * | 11/1987 | Orlowski . |
| 4,890,941 | | 1/1990 | Calafell, II et al. ................. 384/480 |
| 5,028,054 | * | 7/1991 | Peach . |
| 5,046,718 | * | 9/1991 | Hay, II . |
| 5,074,567 | | 12/1991 | Orlowski ................................ 277/25 |
| 5,174,583 | * | 12/1992 | Orlowski et al. . |
| 5,290,047 | * | 3/1994 | Duffee et al. . |
| 5,538,258 | | 7/1996 | Hager et al. ........................... 277/18 |
| 5,636,848 | | 6/1997 | Hager et al. ........................... 277/18 |
| 5,653,448 | | 8/1997 | Schlosser ............................... 277/38 |
| 5,677,584 | | 10/1997 | Keck ....................................... 310/90 |
| 5,908,195 | * | 6/1999 | Sharrer . |
| 6,172,436 | | 1/2001 | Subler et al. . |
| 6,177,744 | | 1/2001 | Subler et al. . |

* cited by examiner

Primary Examiner—Chuck Y. Mah
Assistant Examiner—Vismal Patel
(74) Attorney, Agent, or Firm—Michael Best & Friedrich LLP

(57) ABSTRACT

A bearing shaft seal assembly for an electric motor positioned within an end frame of the motor in order to inhibit the passage of external contaminants axially along a shaft extending out of an end frame into the interior of the motor. The seal assembly including a first seal member, a second seal member and a third seal member; wherein the first seal member is a slinger washer mounted on the shaft so as to be rotatable with the shaft and which is positioned within an inner recess in the end frame, the second seal member is a concaved expansion plug positioned around the shaft and positioned within an outer recess in the end frame which is thereafter caused to be flattened so as to be in fixed relation with respect to the shaft, and the third seal member is a slinger washer mounted on the shaft so as to be rotatable with the shaft and which is positioned adjacent to the expansion plug. The seal assembly further defining a labyrinthine path designed to impede the inflow of external contaminants. The seal assembly further including a drainage slot to allow contaminants found within the labyrinthine path to exit out of the path.

24 Claims, 4 Drawing Sheets

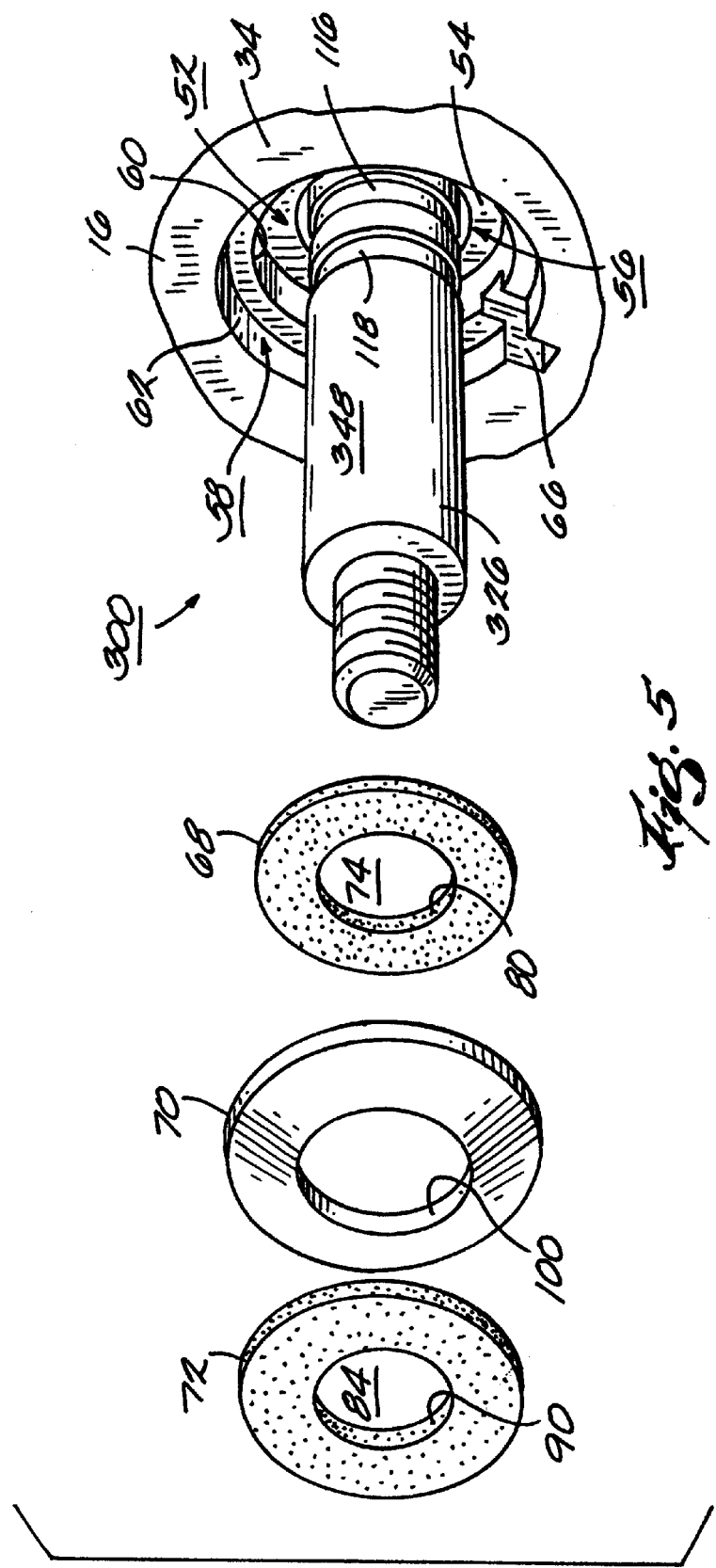

BEARING SHAFT SEAL

FIELD OF THE INVENTION

The present invention relates generally to a sealing assembly for inhibiting passage of particles or liquids between a shaft and an aperture through which the shaft extends. More particularly, the present invention relates to electric motors incorporating a sealing assembly to inhibit passage of external contaminants between a rotatably mounted shaft and a bore in an end frame of the motor through which the shaft extends. Even more particularly, the present invention relates to a labyrinthine bearing shaft seal assembly adapted to seal a passageway between a rotatably mounted shaft and a bore in an end frame of an electric motor in order to prevent passage of external contaminants through the passageway which contaminants could cause damage to motor bearings used to support the shaft or other internal components of the motor.

BACKGROUND OF THE INVENTION

Electric motors typically include a housing and a pair of end frames mounted on the respective ends of the housing. Each end frame includes a bearing for supporting a rotor shaft for rotation about an axis. It is generally desirable to provide a seal for the rotating shaft to prevent contaminants in the surrounding environment from working themselves into contact with the bearings and/or lubricant for the bearings. An important factor that contributes to the operating life of an electric motor is the operating life of the bearings used to support the rotor shaft. If contaminants such as, for example, water, dirt, debris, dust, etc., enter the bearing cavity or other internal cavities of the motor, the operation of the bearings could be adversely affected leading to premature failure of the bearings or of the motor itself. Bearing failures generally require costly repairs to an electric motor or may require replacement of the motor with an entirely new motor.

Electric motors contemplated for use according to the present invention are typically operable in outdoor environments wherein the outer components of the motor are subject to exposure to moisture, dirt, various contaminants or the like. In those situations, it is known to provide various sealing mechanisms between the rotating shaft and the end frame of the motor to prevent external contaminants, particularly water or other liquids, from moving axially along the shaft through the space between the rotating shaft and the end frame and into the interior of the motor housing.

This is also a significant problem for electric motors in pumps used for such things as swimming pools, hot tubs, waste water treatment facilities or other aquatic or fluid transporting/separating apparatuses. In these environments, there is typically provided a sealing device between the pump and the electric motor driving an impeller. On the impeller side of the sealing device, there is typically a fluid, such as water in a swimming pool, under pressure. If the sealing device fails or leaks, the pressurized fluid may be forced through the sealing device and splashed against an exposed outer wall or end frame of the motor through which the motor shaft normally extends. As a result, it is also desirable to have shaft seals in electric motors of this type.

There are several prior mechanisms for sealing an area between a shaft and an end frame of a motor through which the shaft passes. These prior sealing mechanisms include, for example: (1) maintaining a tight tolerance between the end frame and the rotating shaft; (2) positioning a single, generally flat, slinger washer on the rotating shaft near an outer surface of the end frame where the shaft extends through the end frame; or (3) utilizing a standard shaft lip seal assembly.

However, these prior sealing mechanisms either fail to provide adequate protection or, fail to extend motor operating life at a cost that is acceptable to the ultimate consumer.

SUMMARY OF THE INVENTION

Many problems exist with the prior sealing mechanisms. For example, it is difficult to manufacture and maintain a tight tolerance between the end frame and the rotating shaft extending therethrough. The clearance space between the rotating shaft and the stationary end frame must be small enough to prevent the penetration of contaminants, but large enough so that the rotating shaft does not contact the stationary end frame during operation. In addition, manufacturing and/or assembling a motor having such precise tolerance limitations is extremely expensive. This type of sealing mechanism is particularly unsatisfactory in preventing liquid contaminants from contaminating the internal workings of an electric motor.

In an effort to improve upon the mentioned tight tolerance sealing assembly, it is known to mount a single, generally flat, slinger washer on the rotating shaft near an outer surface of the end frame through which the shaft extends. Typically, such slingers are made of rubber. These single slingers may take on any number of different sizes or shapes depending on a manufacturer's preferred method of construction or assembly. Although this solution eliminates the necessity for maintaining a tight tolerance between the shaft and the end frame as required by the tight tolerance sealing method, it has been found that external contaminants, particularly liquid contaminants such as water, are able to easily pass over the outermost periphery of the slinger, travel down a surface of the slinger exposed between the slinger and the end frame and migrate axially along the rotating shaft through the space between the rotating shaft and the end frame, thereby contaminating various internal components of the motor. Stated differently, the prior single slinger seal design does not provide a complex labyrinthine path for the external contaminants to travel. Once the external contaminants pass over or around the outermost edge of the slinger, the travel path of the contaminants does not appreciably change before the contaminants are allowed to gain access to the inside of the motor along the axially extending shaft.

In the other type of known seal, a low-friction lip seal made of a rubber-type material, a thermo plastic material, or even a silicon or graphite-type material is fixed to the end frame of a motor around the rotor shaft such that at least a portion of the lip seal rubs or comes into contact with the outer surface of the rotating shaft. The rubbing action between the lip seal and the shaft eliminates the clearance space between the shaft and the end frame; however, the lip seal also creates a frictional drag on the rotating shaft. In order to prevent external contamination, the lip seal must be of sufficient strength and rigidity to keep the gap closed between the shaft and the end frame. The greater the seal, the greater the motor strength that is needed to overcome the frictional drag created between the shaft and the lip seal. Also, the greater the frictional drag, the greater the overall efficiency of the motor will be undesirably affected.

Accordingly, the invention provides a bearing shaft seal or sealing assembly for an apparatus which includes a shaft extending through a hole in the apparatus, such as, for example, an electric motor. The bearing shaft seal is positioned around a shaft of the motor adjacent to an end frame of the motor through which the shaft extends so as to seal off a clearance space created between the shaft and the end frame. In this way, the sealing assembly according to the present invention effectively closes the clearance space or passageway between the shaft and the end frame to protect the internal cavities of the motor, particularly, a bearing cavity, from undesirable contamination from external influences such as dirt, dust, debris, liquid, etc.

According to one embodiment, the sealing assembly includes a first sealing member or slinger washer, a second sealing member or an expansion plug and, preferably, a third sealing member or a second slinger washer all of which are properly positioned within or near an end frame of, e.g., a motor. In a preferred embodiment, a weep hole or drainage slot is appropriately located so as to operate in conjunction with the other components of the sealing assembly.

According to another embodiment, the seal assembly seals an annular space located between a rotatable shaft and a stationary end frame of a motor through which the shaft extends. The end frame is provided with a recess, preferably a stepped recess, extending into the end frame from an outer face of the end frame. The stepped recess is preferably cylindrical in nature and surrounds a bore in the end frame through which the shaft is placed. A first inner slinger washer is mounted around the shaft and positioned in a suitably sized first recess of the stepped recess. The first slinger is positioned near a bottom surface of the stepped recess. An expansion plug is placed around the shaft and positioned in a suitably sized second recess of the stepped recess adjacent to the first slinger. A second outer slinger washer is mounted around the shaft and positioned adjacent to the expansion plug. Preferably, the slingers are press fitted onto the shaft in such a manner that the slingers are caused to rotate with the shaft. Preferably, the expansion plug avoids contact with the rotating shaft and is stationary with respect to the shaft and the slingers. In an alternative embodiment, the shaft is provided with grooves adapted to receive the respective slingers.

In a preferred embodiment, the expansion plug is originally of a concave shape and is freely positionable into and out of the second recess. After the concave expansion plug is positioned in the second recess with the convex outer surface facing away from the inside of the motor, the convex surface is subjected to an applied force causing the expansion plug to substantially flatten out. As the expansion plug is flattened, the overall diameter of the expansion plug expands so as to cause an outer edge of the expansion plug to abut or dig into an appropriate surface of the stepped recess thereby firmly fixing the expansion plug within the stepped recess.

In another preferred embodiment, the inner slinger, the expansion plug and the outer slinger are positioned within the stepped recess so that none of the mentioned components come into rubbing contact with each other.

The sealing assembly according to one aspect of the present invention provides a labyrinthine path through which external contaminants must travel and change directions numerous times in order to travel from an outside environment to the inside of a motor. The path extends from an external side of the outer slinger, up and over or around the outer slinger, down between the outer slinger and the expansion plug, through the space between the expansion plug and the shaft, up a surface of the inner slinger and over or around the inner slinger, and finally, down between the inner slinger and bottom surface of the stepped recess. If any external contaminants manage to snake around one or more of the components of the sealing assembly as they attempt to travel through the complex labyrinth path, the contaminants will exit the system via the drainage slot prior to reaching the internal cavities of the motor.

A principal feature of the present invention is to provide a sealing assembly that is inexpensive to make and yet capable of sealing a space created between a shaft and a member through which the shaft extends.

A feature of the present invention is to provide a sealing assembly to seal internal cavities of a motor from contamination by external undesirables.

Another feature of the present invention is to provide a sealing assembly that is easy to assemble and which is also capable of appropriately sealing a motor at or near the area where the shaft extends through the end frame of the motor.

A further feature of the present invention is to improve the overall operating life of a motor or other apparatuses by preventing damage to the bearings which normally results from exposure to external contamination, by providing a new, inventive and useful sealing assembly.

Other features and advantages of the invention will become apparent to those skilled in the art upon review of the following detailed description, claims and drawings in which like numerals are used to designate like features.

BRIEF DESCRIPTION OF THE DRAWINGS

FIG. 5 is an exploded perspective view illustrating individual components of an alternative sealing assembly according to the present invention.

Figure 1:
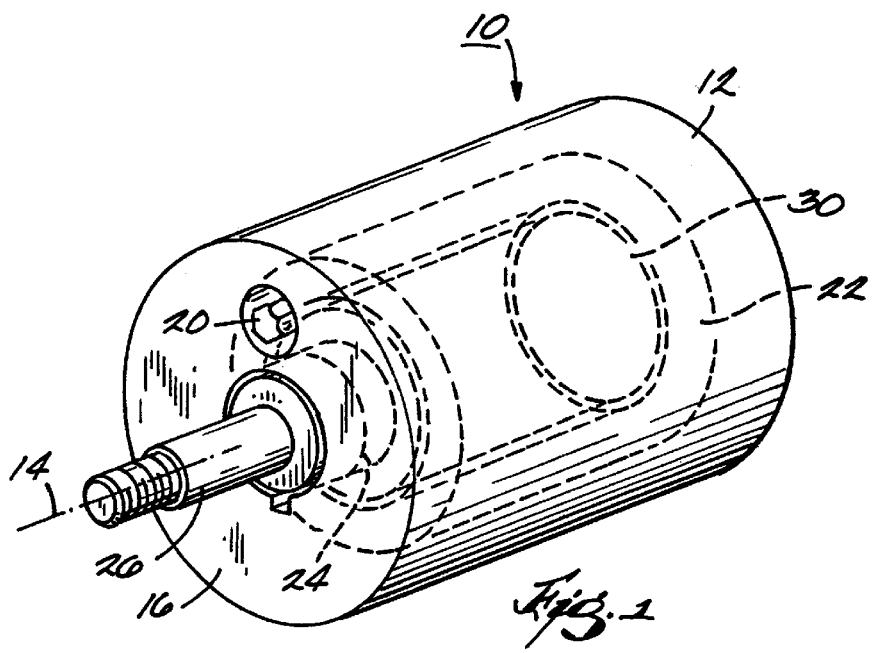
FIG. 1 is a perspective view of an illustrative motor in which the present invention may be employed.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof. The use of "consisting of" and variations thereof herein is meant to encompass only the items listed thereafter and the equivalents thereof. The use of letters to identify steps of a method or process is simply for identification and is not meant to indicate that the steps should be performed in a particular order.

DESCRIPTION OF THE PREFERRED EMBODIMENT

Figure 3:
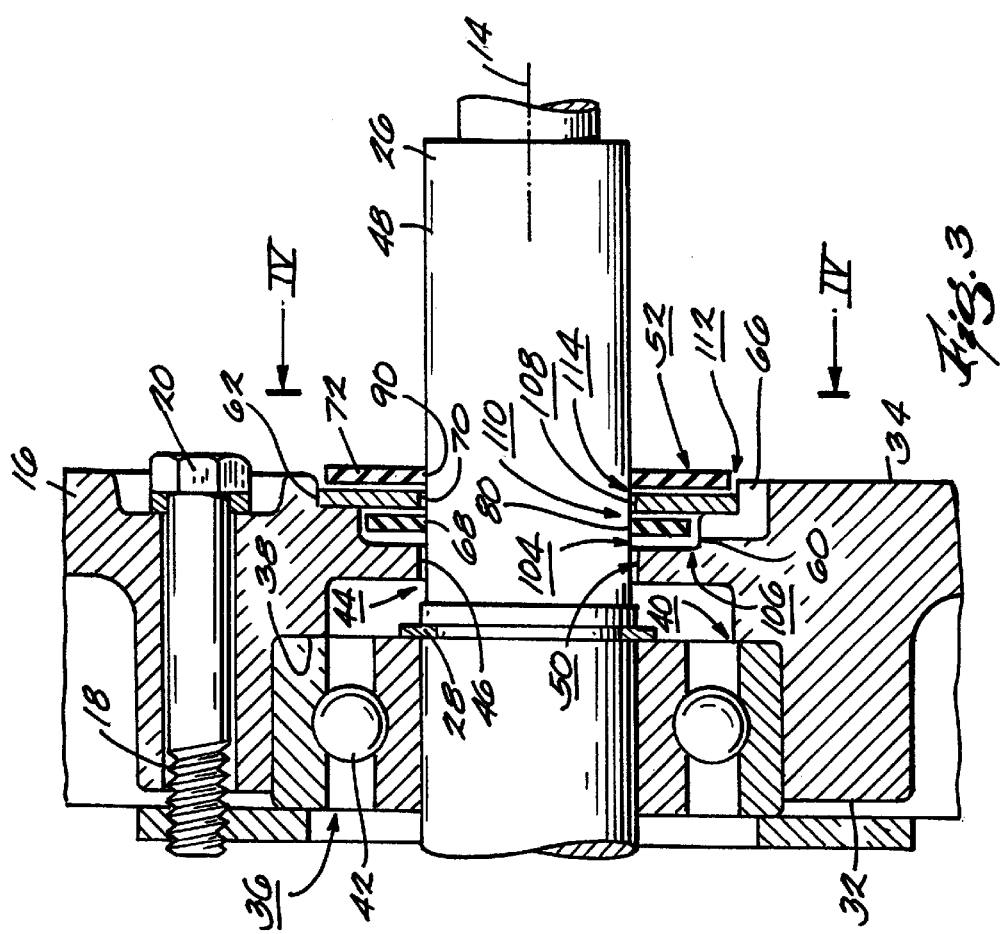
FIG. 3 is an enlarged cross-sectional view of a motor such as that shown in FIG. 1 showing the relationship between a motor shaft, a motor end frame and a sealing assembly according to the present invention.

Illustrated in FIG. 1 is an electric motor 10 embodying the invention. The motor includes a housing 12 having a longitudinal axis 14. The motor also includes an end frame 16 mounted on the housing 12. The motor end frame 16 may have therethrough at least one hole 18 through which bolts or screws 20 extend to conventionally attach the motor end frame 16 to the motor housing 12 (FIG. 3). While in the illustrated construction, the end frame 16 is separate from the housing 12, in an alternative embodiment, the housing 12 and the end frame 16 could be unitary. The electric motor 10 also comprises a stator 22 supported by the housing 12 and fixed relative to the end frame 16. A bearing 24 is supported by the end frame 16. A rotor shaft 26 is supported by the bearing 24 for rotation about the axis 14. The bearing 24 is secured to the shaft 26 at least in part by a conventional retainer member 28 (FIG. 3). A rotor 30 is supported by the shaft 26 for rotation therewith relative to the stator 22. All of which are conventionally known by those skilled in the electric motor industry.

Figure 2:
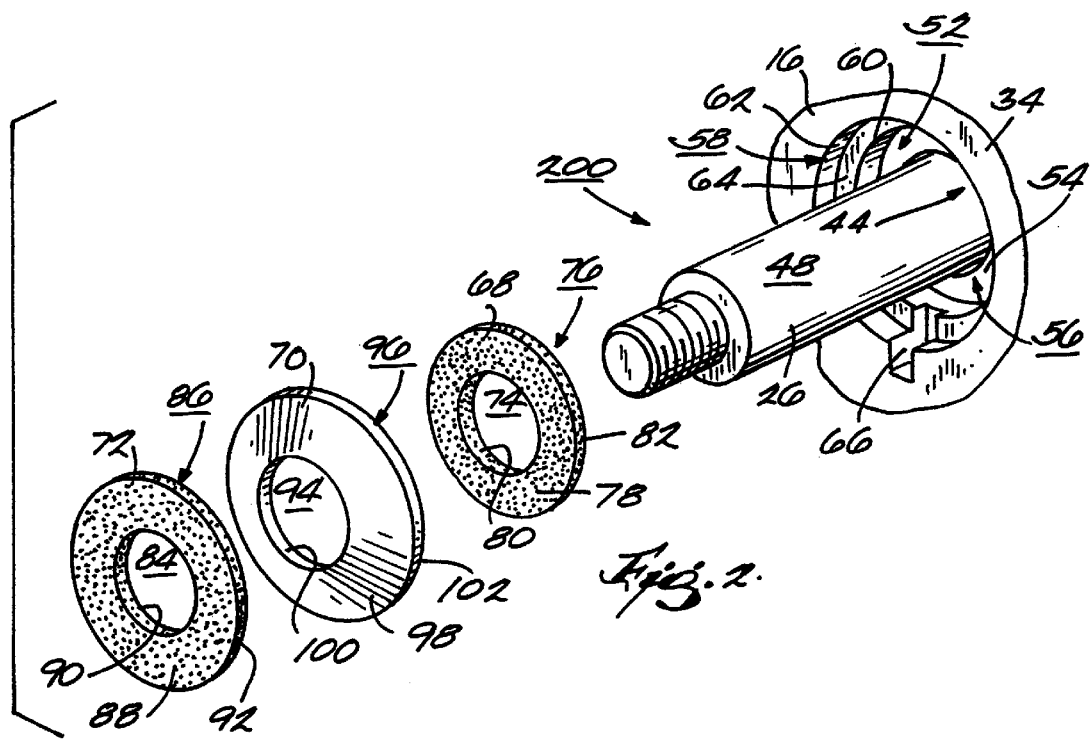
FIG. 2 is an exploded perspective view illustrating individual components of a sealing assembly according to the present invention.

FIGS. 2 and 3 illustrate the end frame 16 in greater detail. End frame 16 is generally made of cast aluminum but may be of any type of material in accordance with the principles of the present invention. The end frame 16 includes an inner, generally planar, end wall face 32 and an outer, generally planar, end wall face 34. The end frame 16 further includes a generally cylindrical bearing cavity 36 which extends inward into the end frame 16 from the inner end wall face 32 and surrounds the axis 14. The bearing cavity 36 includes an annular shoulder 38 thereby defining a bearing seat 40 located within the end frame 16. The bearing 24 is seated in the bearing seat 40 and is thus supported by the end frame 16. Bearing 24 can be a number of different types of bearings but a roller contact bearing with ball bearings 42 as shown is particularly suited for electric motors of the type contemplated for use with the present invention.

With continued reference to FIGS. 2 and 3, the end frame 16 further includes a cylindrical shaft bore 44 extending therethrough around the axis 14 and which is appropriately dimensioned to allow the shaft 26 to be placed through the shaft bore 44 and, as a result, through the end frame 16. The shaft bore 44 is appropriately sized such that the shaft 26 does not come into contact with a cylindrical surface 46 of the bore 44 which closely surrounds the rotatable shaft 26. Thus, the shaft outer surface 48 and the cylindrical surface 46 of the bore 44 are slightly spaced apart so as to permit free relative rotation therebetween. Generally, the clearance space 50 between the shaft 26 and the end frame 16 is on the order of about 0.015 of an inch.

Still referring to FIGS. 2 and 3, the end frame 16 also includes a recessed portion 52 which extends inward into the end frame 16 from the outer end wall face 34 and which surrounds the shaft bore 44. The recessed portion 52 is preferably a cylindrically shaped stepped recess which surrounds the axis 14. The recessed portion 52 includes a generally flat bottom surface 54 which lies in a plane generally normal to the axis 14 and which surrounds the shaft bore 44. Preferably, the recessed portion 52 includes a first inner recess 56 and a second outer recess 58. The inner recess 56 having a cylindrical wall surface 60 and the outer recess 58 having a cylindrical wall surface 62. The outer recess 58 further includes a bottom surface 64 which lies in a plane that is generally parallel to the plane of the bottom surface 54. The surface 64 extends between an end of the cylindrical wall surface 60 which is opposite the other end of the cylindrical wall surface 60 which abuts the bottom surface 54, to an end of the cylindrical wall surface 62 of the outer recess 58. In this manner, the inner recess 56 is defined by the bottom surface 54 and the cylindrical wall surface 60 and the outer recess 58 is defined by the surface 64 and the cylindrical wall surface 62. Preferably, for reasons which will be made apparent below, the diameter of the outer recess 58 is greater than the diameter of the inner recess 56. As shown, the shaft 26 extends through the recessed portion 52.

FIGS. 2 and 3 further illustrate a weep or drainage slot 66 preferably which is at least in part opened to a portion of the recessed portion 52 and which is adapted to allow contaminants found within the recessed portion 52 to exit out of the overall device. The purpose and function of the drainage slot 66 will be further explained below. Preferably, the drainage slot 66 comprises an "L" shape, although the drainage slot 66 may be of different shapes and sizes according to the principles of the present invention. Moreover, the present invention also contemplates providing a drainage slot in a bottom portion of an expansion plug (described below) itself thereby possibly eliminating the need for the drainage slot to extend into the respective surfaces of the recesses and/or end frame as shown in FIGS. 2 and 3.

The shaft bore 44, the recessed portion 52 and the drainage slot 66 may be cast directly into the end frame 16. Alternatively, these components may be machined into the end frame 16. Yet another alternative would be to provide a large aperture (not shown) in the end frame 16 which would accommodate an insert, preferably a steel insert, comprised of the shaft bore 44, the recessed portion 52 and at least a portion of the drainage slot 66.

Turning now to other components of the present invention, reference is first made to FIG. 2. Shown is a cut away portion of the end frame 16, the recessed portion 52, the drainage slot 66, the shaft 26, a first inner slinger washer 68, an expansion or compression plug 70 and a second outer slinger washer 72, all of which are a part of a bearing shaft seal or sealing assembly 200 according to the present invention. To prevent external contaminants such as water and the like from gaining access to the interior of the motor housing, the sealing assembly according to the present invention is disposed for cooperation between the motor shaft and the motor end frame.

The slingers 68 and 72 are preferably cylindrical in shape and made of a suitable material such as a rubber-type material, commonly known to those skilled in the art. The inner slinger 68 includes a centrally located cylindrical hole 74 extending therethrough. The inner slinger 68 also includes an inner face 76, an outer face 78, an inner periphery 80 and an outer periphery 82 both of which respectively extend between the inner face 76 and outer face 78. The outer slinger 72 includes a centrally located cylindrical hole 84 extending therethrough. The outer slinger 72 also includes an inner face 86, an outer face 88, an inner periphery 90 and an outer periphery 92 both of which respectively extend between the inner face 86 and outer face 88. Preferably, for reasons which will be made apparent below, the overall diameter of the outer slinger 72 is greater than the overall diameter of the inner slinger 68.

The expansion plug 70 is preferably generally cylindrical in shape and made of a suitable material such as steel but may be of different materials in accordance with the principles of the present invention. The expansion plug 70 includes a centrally located cylindrical hole 94 extending therethrough. The expansion plug 70 also includes an inner face 96, an outer face 98, an inner periphery 100 and an outer periphery 102 both of which respectively extend between the inner face 96 and outer face 98. As shown in FIG. 2, the expansion plug 70, although generally cylindrical, is also of a, preferably, concave nature. The expansion plug 70 shown in FIG. 2 is not flat like the slingers 68 and 72. The function and purpose of the concaved expansion plug 70 will be further explained below.

Having described certain components of the present invention shown in the FIGS. 1–3, the assembly of the sealing assembly 200 of the present invention will now be described. Although FIG. 2 shows the shaft 26 already positioned through the end frame 16 and the shaft bore 44, it will be readily apparent that the sealing assembly 200 according to the present invention may be pre-assembled within the end frame 16 before the insertion of the shaft 26 through the end frame 16 and thereafter the sealing assembly 200.

With particular reference to FIGS. 2 and 3, the shaft 26 is positioned through the shaft bore 44 in the end frame 16. The first slinger washer 68 is pressed onto the shaft 26. The diameter of the hole 74 of the slinger washer 68 is sized to be originally smaller than the outer diameter of the shaft 26 before the slinger 68 is press fitted onto the shaft 26. Thus, the tight fit between the slinger 68 and the shaft 26 means that there is not any clearance or space between the outer surface 48 of the shaft 26 and the inner periphery 80 of the slinger 68. Since the slinger 68 is made of an elastic type material, the diameter of the hole 74 expands or deforms as needed so as to allow the slinger 68 to slide onto the shaft 26.

The slinger 68 is slid down the shaft 26 until it is positioned within the inner recess 56 of the recessed portion 52. As can be observed most clearly in FIG. 3 with reference to FIG. 2, the inner slinger 68 is positioned in the inner recess 56 such that the inner face 76 of the slinger 68 preferably is not positioned against the bottom surface 54 of the recessed portion 52. Thus, there exists a small clearance space 104 between the bottom surface 54 of the recessed portion 52 and the inner face 76 of the slinger 68. As can also be observed, the inner recess 56 is deep enough, as defined by the length of the cylindrical wall surface 60, to accommodate the thickness of the slinger 68 as such is defined by the depth of the outer periphery 82. In other words, the slinger 68 is preferably positioned within the inner recess 56 such that the outer face 78 of the slinger 68 is slightly below the end of the cylindrical wall surface 60 which is opposite the end which abuts the bottom surface 54. As also shown in FIG. 3, the diameter of the inner recess 56 is slightly larger than the overall diameter of the first slinger 68 thereby creating a small clearance or space 106 between the outer periphery 82 of the slinger 68 and the cylindrical wall surface 60 of the inner recess 56. As should be apparent, the snug fit between the slinger 68 and the shaft 26 allows for the slinger 68 to rotate with the shaft 26. Further, the clearance spaces 104 and 106 prevent the slinger 68 from rubbing against the bottom surface 54 and cylindrical wall surface 60 of the inner recess 56 so as not to detrimentally prematurely wear out the slinger 68 or create frictional drag between the rotating slinger 68 and the respective stationary components which could cause inefficient motor operation.

After the inner slinger 68 is properly positioned, the expansion plug 70 is freely slid over the shaft 26. The diameter of the hole 94 of the expansion plug 70 is slightly larger than the outer diameter of the shaft 26. The expansion plug 70 is preferably slid onto the shaft 26 with the inner face 96 facing the end frame 16 and the convex outer face 98 facing away from the end frame 16. The expansion plug 70 is slid down the shaft 26 until a portion of the inner face 96 rests against the surface 64 of the outer recess 58. When first positioned within the outer recess 58, although not clearly shown, the overall outer diameter of the expansion plug 70 is slightly smaller than the diameter of the outer recess 58. In this way, the expansion plug 70 is freely movable in and out of the second recess 58. However, once the expansion plug 70 is positioned so as to be resting against the surface 64, the convex outer face 98 of the expansion plug 70 is flattened which causes the overall outer diameter of the plug 70 to expand. In other words, an outside force (not shown) is applied against the outer face 98 so as to cause the convex surface 98 to flatten out as shown in final form in FIG. 3. The outside force may be applied with any standard or suitable pressing device, either manually or automatically, as such devices and techniques are commonly understood by those skilled in the art.

With particular reference to FIG. 3, it can be observed that, although still generally cylindrical, the expansion plug 70 in final form will be generally flat in nature like the shape of the slingers 68 and 72. Once flattened, the outer periphery 102 of the expansion plug 70 is caused to abut the cylindrical wall surface 62 of the outer recess 58. In an alternative embodiment, the outer periphery 102 actually digs into the wall 62. As such, the final diameter of the expansion plug 70 is, for all practical purposes, the same as or slightly greater than the diameter of the second recess 58. The expansion plug 70, then, is caused to engage or mate with the wall 62 so that the expansion plug 70 is substantially fixed within the outer recess 58. In other words, once flattened, an external force will be needed in order to remove the expansion plug 70 from the outer recess 58. Also, once flattened, there does not exist a clearance space between the outer periphery 102 of the expansion plug 70 and the wall 62 of the outer recess 58. Moreover, as shown, the diameter of the hole 94 of the expansion plug 70 remains greater than the outer diameter of the shaft 26 even after the expansion plug 70 has been flattened. Preferably, the clearance space 108 or tolerance between the inner periphery 100 of the expansion plug 70 and the outer surface 48 of the shaft 26 is held on the order of about 0.015 of an inch. This allows the shaft 26 to rotate within the hole 94 of the expansion plug 70 without causing damage to the shaft 26 or the expansion plug 70 which would most likely occur if the rotating shaft 26 would come into contact with the stationary expansion plug 70.

Referring again to FIG. 3 with reference to FIG. 2, the second or outer recess 58 is preferably deep enough, as defined by the length of the cylindrical wall 62, to accommodate the thickness of the expansion plug 70 as such is defined by the depth of the outer periphery 102. The expansion plug 70 is preferably positioned within the second recess 58 such that the outer face 98 is below the outer end wall face 34 of the end frame 16. However, in alternative embodiments, the depth of the second recess 58 may vary. For instance, the depth of the second recess 58 could be equal to or smaller than the thickness of the expansion plug 70 and still function according to the principles of the present invention.

As shown in FIG. 3, preferably, once the expansion plug 70 is flattened and properly located within the second recess 58, the inner face 96 of the expansion plug 70 is not positioned against the outer face 78 of the first slinger washer 68 located within the first recess 56 for the same reasons as previously set forth with respect to why the rotating slinger 68 preferably does not rub against other stationary components. Even so, the present invention will properly function even if the first slinger 68 comes into contact with the expansion plug 70 in accordance with the principles of the present invention. In the preferred non-rubbing embodiment, there exists a clearance or space 110 between the respective surfaces of the first slinger 68 and the expansion plug 70.

Remaining, is the second outer slinger 72. With reference again to FIGS. 2 and 3, the second slinger washer 72 is pressed onto the shaft 26 in much the same fashion as the first slinger washer 68 is pressed onto the shaft 26. The diameter of the hole 84 of the slinger 72 is sized to be originally smaller than the outer diameter of the shaft 26 before the slinger 72 is press-fitted onto the shaft 26. Thus, the tight fit between the slinger 72 and the shaft 26 means that there is not any clearance or space between the outer surface 48 of the shaft 26 and the inner periphery 90 of the slinger 72. Since the slinger 72 is made of an elastic type material, the diameter of the hole 84 expands or deforms as needed so as to allow the slinger 72 to slide onto the shaft 26. As should be apparent, slinger 72 rotates with the shaft 26. The slinger 72 is slid down the shaft 26 until it is positioned in close proximity to the outer face 98 of the expansion plug 70. For the same reasons as explained with respect to providing clearances between the first slinger washer 68 and its various surrounding components, it is preferred that the slinger 72 not come into contact with the expansion plug 70 or end frame 16. However, as with the first slinger 68, the present invention will function according to the principles of the invention even if the slinger 72 comes into contact with the expansion plug 70 or end frame 16. The outer recess 58 may be deep enough, as defined by the length of the cylindrical wall 62, to accommodate the entire thickness of the slinger 72, as defined by the depth of the outer periphery 92, or only deep enough to accommodate a portion of the entire thickness of the slinger 72, or the second recess 58 may not be deep enough to accommodate any portion of the slinger 72. If any portion of the slinger 72 extends within the outer recess 58, as shown in FIG. 3, preferably, a clearance or space 112 is provided between the outer periphery 92 of the slinger 72 and the cylindrical wall surface 62 of the outer recess 58 for the same reasons as previously described. In such an embodiment, the diameter of the second recess 58 is slightly larger than the overall diameter of the second slinger 72. In an alternative embodiment, the overall diameter of the slinger 72 is greater than the diameter of the second recess 58. In such an embodiment, the inner face 86 of the slinger 72 is positioned in close proximity to the outer end wall face 34 of the end frame 16. Preferably, in this embodiment, the depth of the second recess 58 would be approximately the same as or slightly larger than the overall thickness of the expansion plug 70. In any case, preferably, there exists a clearance space 114 between the respective surfaces of the expansion plug 70 and outer slinger 72.

Figure 4:
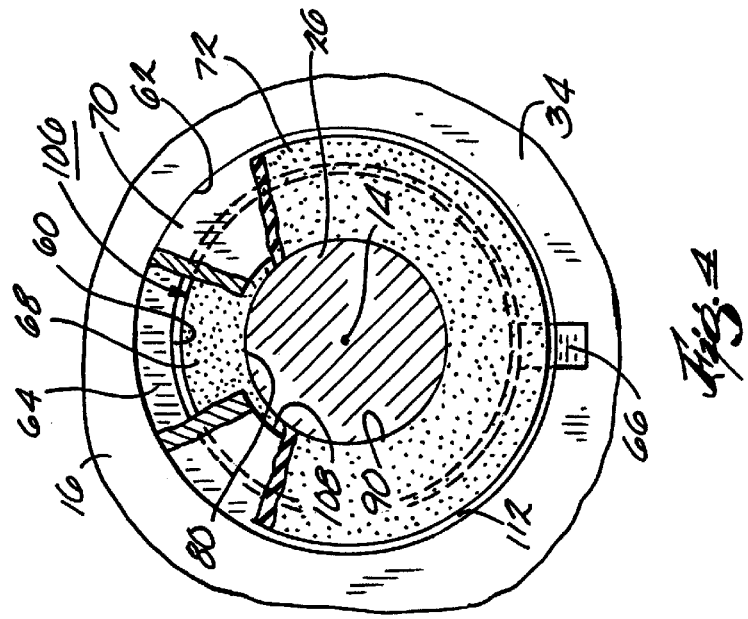
FIG. 4. is a front view taken along line IV—IV in FIG. 3 showing in another view the components the sealing assembly according to the present invention.

Having described the components and assembly of the present invention, FIG. 4 is provided to show a front view of the preferred embodiment according to the present invention. Of note, FIG. 4 shows that a portion of drainage slot 66 extends out of the outer end wall face 34 of the end frame 16 for reasons which will be further explained below.

The overall operation of the present invention will now be described. A feature of the present invention is to prevent external contaminants in the surrounding environment from migrating into the interior of the motor housing 12 or particularly the bearing cavity 36 of the motor 10 which could cause undesirable damage to the motor bearing 24 or other internal components. As explained, motors similar to motor 10 as shown in FIG. 1 in which the present invention may be employed, often find themselves placed in an environment where contaminants such as water or the like may come into contact with or be forced against the outer portions of such motors, including the motor end frames. In those situations, contaminants have been known to find their way into the interior of these motors because prior sealing arrangements between the rotor shafts and the end frames do not satisfactorily seal the internal components of the motor from the surrounding environment. The present invention solves this problem and other problems, by providing a bearing shaft sealing assembly at or near the location where a shaft extends out of a motor through an end frame by creating an extensive labyrinthine or complex path in which external contaminants must pass through in order for the contaminants to travel from an outside environment into the interior of the motor.

As explained, the outer slinger 72 rotates with the shaft 26. In this way, any contaminants which come into contact with the slinger 72 are slung outward with respect to the slinger 72, which itself tends to impede inflow of contaminants. Since there is no clearance space between the shaft 26 and the slinger 72, external contaminants must first travel or creep up the outer face 88 of the slinger 72 and into the small clearance space 112 defined between the outer periphery 92 of the slinger 72 and the wall 62 of the outer recess 58. Since there is no clearance space between the expansion plug 70 and the wall 62 of the outer recess 58, any external contaminants which reach the space 112 must change directions and travel down the clearance space 114 defined between the expansion plug 70 and the outer slinger 72 toward the shaft 26. From the space 114, the contaminants must flow through the space 108 defined between the inner periphery 100 of the expansion plug 70 and the outer surface 48 of the shaft 26 which hence undergoes another flow reversal which further impedes the inward flow of contaminants. Since there is no space between the inner slinger 68 and the shaft 26, any external contaminants which reach this point must change directions again and travel or creep upward away from the shaft 26 through the space 110 defined between the expansion plug 70 and the inner slinger 68. Thereafter, if continuing to move through the sealing assembly, the external contaminants will have to reach the outermost part of the inner slinger 68 and thus the space 106 defined between the wall 60 of the inner recess 56 and the outer periphery 82 of the inner slinger 68 in order to continue on. Any contaminants which happen to reach space 106 must then once again change directions and travel down the space 104 defined between the bottom surface 54 of the inner recess 56 and the inner slinger 68 toward the shaft 26. Preferably, the contaminants within space 104 flow downwardly to the lowermost extremity thereof, at which point the contaminants are discharged back to the environment through the drainage slot 66. It should be noted that the drainage slot 66 is also capable of capturing contaminants at other locations along the sealing assembly 200 since the first recess 56 and second recess 58 preferably open to the drainage slot 66.

If contaminants move into any of the described spaces of the labyrinth sealing assembly 200, the natural tendency of the sealing assembly is to restrict the continuous movement of the contaminants through the sealing assembly in view of the narrowness of the spaces and the corners associated with the components of the sealing assembly.

Figure 6:
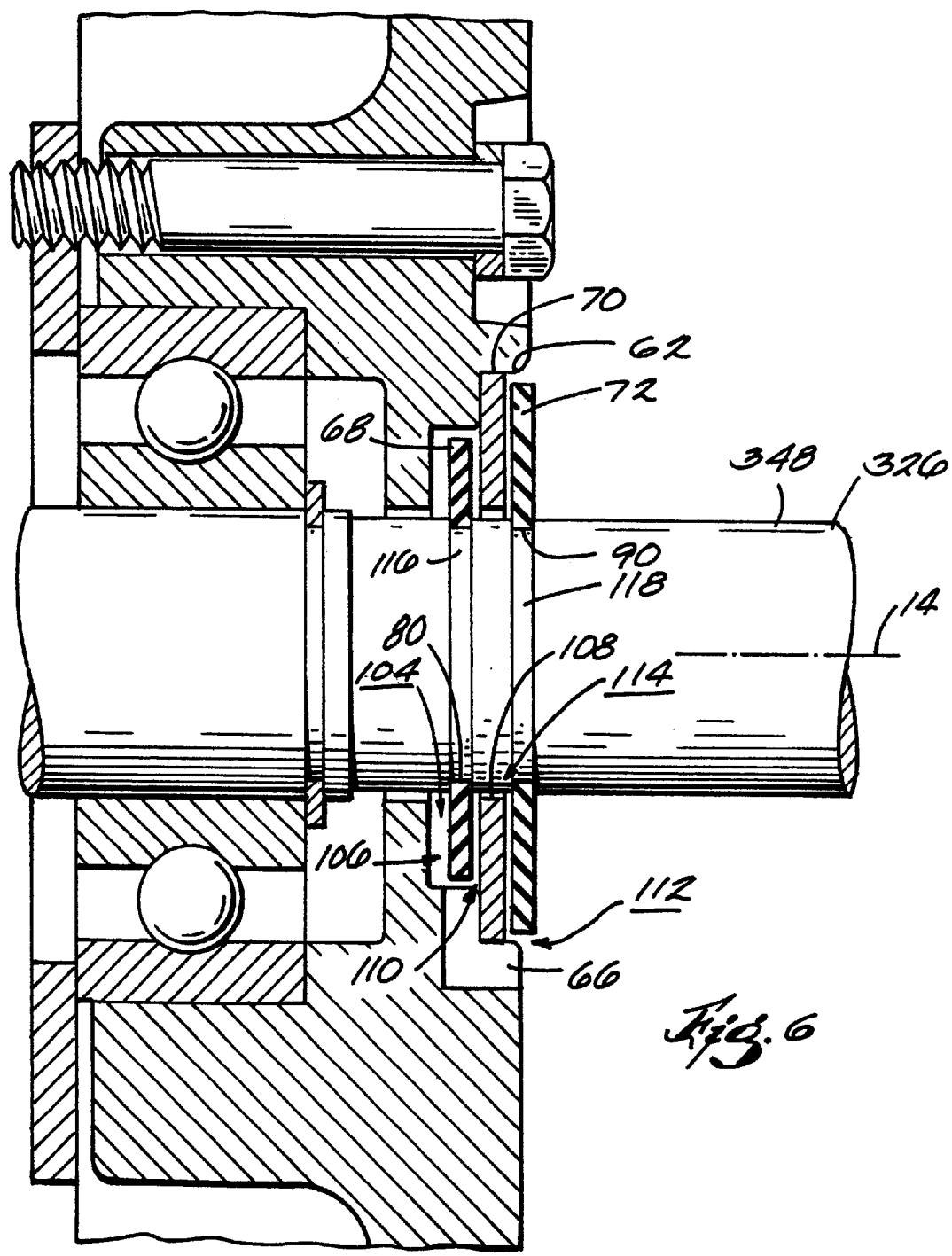
FIG. 6 is an enlarged cross-sectional view of a motor such as that shown in FIG. 1 showing the relationship between a motor shaft, a motor end frame and an alternative sealing assembly such as that shown in FIG. 5 according to the present invention.

FIGS. 5 and 6 illustrate an alternative embodiment of the present invention. Except as described below, the sealing assembly 300 is substantially identical to the sealing assembly 200, and common elements have been labeled with the same reference numbers. Shown in FIG. 5 is a cut-away portion of the end frame 16, the recessed portion 52, the drainage slot 66, a shaft 326, the first inner slinger washer 68, the expansion or compression plug 70 and the second outer slinger washer 72, all of which are a part of a bearing shaft seal or sealing assembly 300 according to the present invention. The shaft 326 includes a first annular groove 116 and a second annular groove 118. As shown in FIG. 6, the inner slinger 68 is positioned in groove 116 and the outer slinger 72 is positioned in groove 118. The elastic slingers 68 and 72 are adapted to expand or deform to fit around shaft 326 as explained with reference to FIG. 2, but in this embodiment, the diameters of the respective holes 74 and 84 return back to substantially their original shape as the slingers 68 and 72 are positioned in respective grooves 116 and 118. In this manner, there is provided an alternative sealing arrangement between the slingers 68 and 72 and the outer surface 348 of the shaft 326 to further prevent external contaminants such as water and the like from gaining access to the interior of the motor housing.

In other embodiments, some or all of the clearance spaces defined throughout the labyrinth sealing system may be eliminated by allowing the various components of the sealing assembly to come into contact with other components of the sealing assembly. However, the preferred embodiment is to provide a sealing assembly that does not have any rubbing parts so as to maximize the life of the components.

As shown, the recesses and slingers are preferably of different sizes, respectively, in order to create a more complex path. However, it should be noted that various combinations regarding the sizes of the slingers and recesses are contemplated by the present invention. It should also be noted that although the expansion plug is preferably concave, the expansion plug may be of any number of different shapes and sizes, such as convex, according to the principles of the present invention. Of note, the rotating slingers and stationary expansion plug may be rearranged in any number of different combinations and still fall within the scope of the present invention.

The extensive labyrinth path of the preferred sealing assembly is designed to prevent practically any and all external contaminants from infiltrating the interior chambers of the motor at or near the location where the shaft extends out of the end frame. A sealing device according to the present invention is particularly effective in preventing contaminants splashed onto the shaft and/or end frame from gaining access to the interior of the motor housing. Preventing motor bearing damage normally attributable to adverse exposure to contaminants will maximize the overall operating life of a motor.

Although the preferred embodiment describes a sealing assembly for use in an electric motor, the sealing assembly according to the present invention is capable of use in any situation where it is desirable to seal a space created between a shaft and a member which the shaft extends through. Particularly, the present invention is useful in those situations where a shaft cooperates with a bearing and it is desirable to seal a space created between the shaft and an end member which houses the bearing in order to prevent contaminants from causing damage to the bearing assembly. It is contemplated that the present invention is capable of use in, for example, generators, farming implements, yard equipment or the like.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. For example, in addition to the sealing features under dynamic operating conditions, the seal assembly is also highly effective for preventing flow of contaminants therethrough under static conditions. Moreover, although the principal focus of the present invention is directed toward keeping external contaminants out of the interior of the motor housing, the sealing assembly according to the present invention is also capable of preventing lubricants such as bearing lubricants from leaking out of the interior of the motor housing into the surrounding environment. In addition, although two recesses, two slingers and one expansion plug are preferred, a single recess, a single slinger and a single expansion plug may be provided and, on the other hand, additional recesses, additional slingers and/or additional expansion plugs may also be provided according to the principles of the present invention. Further, although the preferred embodiment describes cylindrical recesses, cylindrical slingers and a cylindrical expansion plug, other shapes and sizes for these components may be provided according to the principles of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. An electric motor comprising:
    an end frame having a shaft bore extending therethrough, said end frame further including a generally cylindrical stepped recess, said stepped recess comprising a generally cylindrical inner recess and a generally cylindrical outer recess;
    a shaft supported for rotation relative to said end frame about an axis, said shaft extending through said shaft bore and said stepped recess;
    a first generally cylindrical deformable slinger washer mounted on said shaft thereby creating a tight fit between said first slinger and said shaft so that said first slinger is rotatable with said shaft, said first slinger being positioned within said inner recess;
    an expandable generally cylindrical plug having a convex face positioned around said shaft and into said outer recess, said convex surface of said plug being transformed into a generally flat surface such that said plug is expandable so that said plug is fixed to said end frame within said outer recess;
    a second generally cylindrical deformable slinger washer mounted on said shaft thereby creating a tight fit between said second slinger and said shaft so that said second slinger is rotatable with said shaft, said second slinger positioned adjacent to said plug; and
    a labyrinth path through which external contaminants are inhibited from passing, said path extending up and over said second slinger, down between said second slinger and said plug, through a space between said plug and said shaft, up and over said first slinger and down between said first slinger and a bottom surface of said stepped recess.

2. An electric motor according to claim 1, further comprising a drainage slot which is at least in part opened to a portion of said stepped recess and which is adapted to allow contaminants found within said stepped recess to exit out of said stepped recess.

3. An electric motor according to claim 1, wherein said shaft includes a first groove and a second groove and, wherein said first seal member is mounted in said first groove and said third seal member is mounted in said second groove.

4. An electric motor according to claim 2, wherein said shaft includes a first groove and a second groove and, wherein said first seal member is mounted in said first groove and said third seal member is mounted in said second groove.

5. An electric motor comprising:

an end frame having a shaft bore extending therethrough and a recessed portion which is a stepped recess including an inner recess and an outer recess adjacent to said inner recess, and which surrounds said shaft bore, wherein said outer recess has a larger diameter than said inner recess;

a shaft supported for rotation relative to said end frame about an axis, said shaft extending through said shaft bore and said recessed portion;

a first seal member mounted on said shaft and positioned within one of said inner recess and said outer recess; and a second seal member positioned around said shaft and fixed to said end frame within the other of said inner recess and said outer recess, so that said seal members cooperatively prevent passage of external contaminants between said shaft and said shaft bore.

6. An electric motor according to claim 5, further comprising a third seal member mounted on said shaft.

7. An electric motor according to claim 6, wherein said shaft includes a first groove and a second groove and, wherein said first seal member is mounted in said first groove and said third seal member is mounted in said second groove.

8. An electric motor according to claim 6, wherein said first seal member is positioned within said inner recess and said second seal member is positioned within said outer recess.

9. An electric motor according to claim 8, further comprising a labyrinth path through which the external contaminants are inhibited from passing, said path extending up and over said third seal member, down between said third seal member and said second seal member, through a space between said second seal member and said shaft, up and over said second seal member and down between said second seal member and a bottom surface of said stepped recess.

10. An electric motor according to claim 9, further comprising a drainage slot which is at least in part opened to a portion of said stepped recess and which is adapted to allow contaminants found within said stepped recess to exit out of said stepped recess.

11. An electric motor comprising:

an end frame having a shaft bore extending therethrough and a recessed portion which is a stepped recess including an inner recess and an outer recess, and which surrounds said shaft bore, wherein said outer recess has a larger diameter than said inner recess;

a shaft supported for rotation relative to said end frame about an axis, said shaft extending through said shaft bore and said recessed portion;

a first seal member mounted on said shaft and positioned within one of said inner recess and said outer recess; and a second seal member having a convex face being positioned around said shaft and placed within said recessed portion, said convex surface of said seal member being transformed into a generally flat surface such that said second seal member is expandable so that said second seal member is fixed to said end frame within the other of said inner recess and said outer recess, so that said seal members cooperatively prevent passage of external contaminants between said shaft and said shaft bore.

12. An electric motor according to claim 11, further comprising a third seal member mounted on said shaft.

13. An electric motor according to claim 12, wherein said shaft includes a first groove and a second groove and, wherein said first seal member is mounted in said first groove and said third seal member is mounted in said second groove.

14. An electric motor according to claim 12, wherein said first seal member is positioned within said inner recess and said second seal member is positioned within said outer recess.

15. An electric motor according to claim 14, further comprising a labyrinth path through which the external contaminants are inhibited from passing, said path extending up and over said third seal member, down between said third seal member and said second seal member, through a space between said second seal member and said shaft, up and over said second seal member and down between said second seal member and a bottom surface of said stepped recess.

16. An electric motor according to claims 15, further comprising a drainage slot which is at least in part opened to a portion of said stepped recess and which is adapted to allow contaminants found within said stepped recess to exit out of said stepped recess.

17. A method of assembling an electric motor comprising the steps of:

providing an end frame having a shaft bore extending therethrough and a recessed portion;

supporting a shaft for rotation about an axis relative to said end frame;

extending said shaft through said shaft bore and said recessed portion;

mounting a first seal member on said shaft;

placing said first seal member within an inner recess of said recessed portion;

positioning a second seal member around said shaft in fixed relation to said end frame within said recessed portion;

placing said second seal member within an outer recess of said recessed portion;

mounting a third seal member on said shaft;

placing said third seal member adjacent to said second seal member; and providing a labyrinth path extending up and over said third seal member, down between said third seal member and said second seal member, through a space between said second seal member and said shaft, up and over said second seal member and down between said second seal member and a bottom surface of said recessed portion, so that said seal members inhibit external contaminants from passing between said shaft and said shaft bore.

18. A method according to claim 17, further including the step of providing a drainage slot which is at least in part opened to a portion of said recessed portion and which is adapted to allow contaminants found within said recessed portion to exit out of said recessed portion.

19. A sealing assembly comprising:

a member having a shaft bore extending therethrough and a recessed portion which is a stepped recess including an inner recess and an outer recess, and which surrounds said shaft bore, wherein said outer recess has a larger diameter than said inner recess;

a shaft supported for rotation relative to said member about an axis, said shaft extending through said shaft bore and said recessed portion;

a first seal member mounted on said shaft and positioned within one of said inner recess and said outer recess; and a second seal member having a convex face being positioned around said shaft and placed within said recessed portion, said convex surface of said seal member being transformed into a generally flat surface such that said second seal member is expandable so that said second seal member is fixed to said member within the other of said inner recess and said outer recess, so that said seal members cooperatively prevent passage of external contaminants between said shaft and said shaft bore.

20. An electric motor according to claims 19, further comprising a third seal member mounted on said shaft.

21. An electric motor according to claim 20, wherein said shaft includes a first groove and a second groove and, wherein said first seal member is mounted in said first groove and said third seal member is mounted in said second groove.

22. An electric motor according to claim 20, wherein said first seal member is positioned within said inner recess and said second seal member is positioned within said outer recess.

23. An electric motor according to claim 22, further comprising a labyrinth path through which the external contaminants are inhibited from passing, said path extending up and over said third seal member, down between said third seal member and said second seal member, through a space between said second seal member and said shaft, up and over said second seal member and down between said second seal member and a bottom surface of said stepped recess.

24. An electric motor according to claim 23, further comprising a drainage slot which is at least in part opened to a portion of said stepped recess and which is adapted to allow contaminants found within said stepped recess to exit out of said stepped recess.

* * * * *